(12) United States Patent
Li et al.

(10) Patent No.: US 9,619,016 B2
(45) Date of Patent: Apr. 11, 2017

(54) METHOD AND DEVICE FOR DISPLAYING WALLPAPER IMAGE ON SCREEN

(71) Applicant: Xiaomi Inc., Beijing (CN)

(72) Inventors: Ye Li, Beijing (CN); Weiliang Zhang, Beijing (CN); Guoming Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 127 days.

(21) Appl. No.: 14/507,025

(22) Filed: Oct. 6, 2014

(65) Prior Publication Data

US 2015/0279001 A1 Oct. 1, 2015

Related U.S. Application Data

(63) Continuation of application No. PCT/CN2014/082921, filed on Jul. 24, 2014.

(30) Foreign Application Priority Data

Mar. 31, 2014 (CN) .......................... 2014 1 0125658

(51) Int. Cl.
*G06F 3/01* (2006.01)
*G06F 3/0484* (2013.01)
*G06F 3/0346* (2013.01)
*G06F 3/0481* (2013.01)

(52) U.S. Cl.
CPC ................ *G06F 3/01* (2013.01); *G06F 3/017* (2013.01); *G06F 3/0346* (2013.01); *G06F 3/04815* (2013.01); *G06F 3/04842* (2013.01)

(58) Field of Classification Search
CPC .................................................. G06F 3/04815
See application file for complete search history.

(56) References Cited

U.S. PATENT DOCUMENTS

| | | | |
|---|---|---|---|
| 2002/0024506 A1* | 2/2002 | Flack | G06F 1/1626 345/169 |
| 2002/0033849 A1* | 3/2002 | Loppini | G06F 3/04815 715/848 |
| 2007/0097116 A1* | 5/2007 | Ito | G06F 3/04815 345/419 |

(Continued)

FOREIGN PATENT DOCUMENTS

| CN | 101739199 A | * | 6/2010 |
|---|---|---|---|
| CN | 102546905 A | | 7/2012 |

(Continued)

OTHER PUBLICATIONS

International Search Report for PCT/CN2014/082921 in both Chinese and English from the State Intellectual Property Office of the P.R. China, mailed Jan. 6, 2015.*

(Continued)

*Primary Examiner* — Jeffery A Brier
(74) *Attorney, Agent, or Firm* — Finnegan, Henderson, Farabow, Garrett & Dunner LLP

(57) ABSTRACT

A method for displaying an image on a terminal, includes: acquiring current posture information of the terminal; selecting, according to the current posture information, a target area in a preset image as a wallpaper image of the terminal; and displaying the wallpaper image on a screen of the terminal.

9 Claims, 5 Drawing Sheets

(56) References Cited

U.S. PATENT DOCUMENTS

| | | | |
|---|---|---|---|
| 2008/0030360 A1* | 2/2008 | Griffin | G06F 1/1626 340/689 |
| 2009/0313584 A1* | 12/2009 | Kerr | G06F 3/012 715/849 |
| 2011/0296339 A1* | 12/2011 | Kang | G06F 3/04815 715/782 |
| 2012/0013553 A1* | 1/2012 | Kim | G06F 3/0346 345/173 |
| 2012/0056878 A1* | 3/2012 | Miyazawa | G06F 3/0346 345/173 |
| 2012/0188243 A1* | 7/2012 | Fujii | G06T 19/20 345/426 |
| 2013/0201217 A1 | 8/2013 | Morinaga et al. | |
| 2014/0132637 A1* | 5/2014 | Yang | G06T 11/60 345/649 |

FOREIGN PATENT DOCUMENTS

| | | | |
|---|---|---|---|
| CN | 102902468 A | | 1/2013 |
| CN | 103000161 A | * | 3/2013 |
| CN | 103079013 A | | 5/2013 |
| CN | 103472976 A | * | 12/2013 |
| CN | 103530056 A | | 1/2014 |
| EP | 2408181 A1 | | 1/2012 |
| EP | 2426574 A2 | | 3/2012 |
| EP | 2927787 A1 | * | 7/2015 |
| JP | 09-062861 A | | 3/1997 |
| JP | 09-29301 A | | 10/1997 |
| JP | 2007-128158 A | | 5/2007 |
| JP | 2010092086 | | 4/2010 |
| JP | 2011-108028 A | | 6/2011 |
| JP | 2012-058900 | | 3/2012 |
| JP | 2012155554 | | 8/2012 |
| JP | 2003501762 | | 1/2013 |
| KR | 1020090122040 | | 11/2009 |
| KR | 1020110040110 | | 4/2011 |
| RU | 2504322 C2 | | 1/2014 |
| WO | WO-2015/149457 A1 | * | 8/2015 |

OTHER PUBLICATIONS

Weinzierl, M., "Rounded Photo World", document No. XP-002740287, dated Jan. 2007, www.colorfoto.de pp. 104-109, English translation (1 pg).

Eike, U,, "Ball Images using Photoshop", document No. XP-002740288, dated Jan. 10, 2014, http://www.com-magazin.de/tipps-tricks/photoshop/kugelbilder-photoshop-233905.html.

Extended Search Report for European Application No. 15157835.3, from the European Patent Office, dated Jun. 11, 2015.

English version of Search Report of International Application No. PCT/CN2014/082921, mailed from the State Intellectual Property Office of the P.R. China, dated Jan. 6, 2015.

Notification on Results of invention Patentability Check for Russian Application No. 2015133791/08(051947), from Russian Patent Office, dated Dec. 13, 2016.

* cited by examiner

METHOD AND DEVICE FOR DISPLAYING WALLPAPER IMAGE ON SCREEN

CROSS REFERENCE TO RELATED APPLICATIONS

This application is a continuation of International Application No. PCT/CN2014/082921, filed Jul. 24, 2014, which is based upon and claims priority to Chinese Patent Application No. 201410125658.5, filed Mar. 31, 2014, the entire contents of all of which are incorporated herein by reference.

TECHNICAL FIELD

The present disclosure relates to the field of terminal technology and, more particularly, to a method and a device for displaying a wallpaper image on a terminal.

BACKGROUND

With the development of terminal technology, the function of displaying wallpaper images on a terminal may significantly affect users' experience. The development of the function of displaying wallpaper images has attracted more attention.

Conventional functions of displaying wallpaper images generally introduce a variable of time into static wallpaper images. By setting a relationship between time periods and corresponding wallpaper images to be displayed in advance, the terminal can display a corresponding wallpaper image in a specific time period, so that the displayed wallpaper images change with time.

SUMMARY

According to a first aspect of the present disclosure, there is provided a method for displaying an image on a terminal, comprising: acquiring current posture information of the terminal; selecting, according to the current posture information, a target area in a preset image as a wallpaper image of the terminal; and displaying the wallpaper image on a screen of the terminal.

According to a second aspect of the present disclosure, there is provided a terminal, comprising: a processor; a screen coupled to the processor; a memory for storing instructions executable by the processor; wherein the processor is configured to: acquire current posture information of the terminal; select, according to the current posture information, a target area in a preset image as a wallpaper image of the terminal; and display the wallpaper image on the screen of the terminal.

According to a third aspect of the present disclosure, there is provided a non-transitory readable storage medium having stored therein instructions that, when executed by a processor of a terminal, cause the terminal to perform a method for displaying an image, the method comprising: acquiring current posture information of the terminal; selecting, according to the current posture information, a target area in a preset image as a wallpaper image of the terminal; and displaying the wallpaper image on a screen of the terminal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
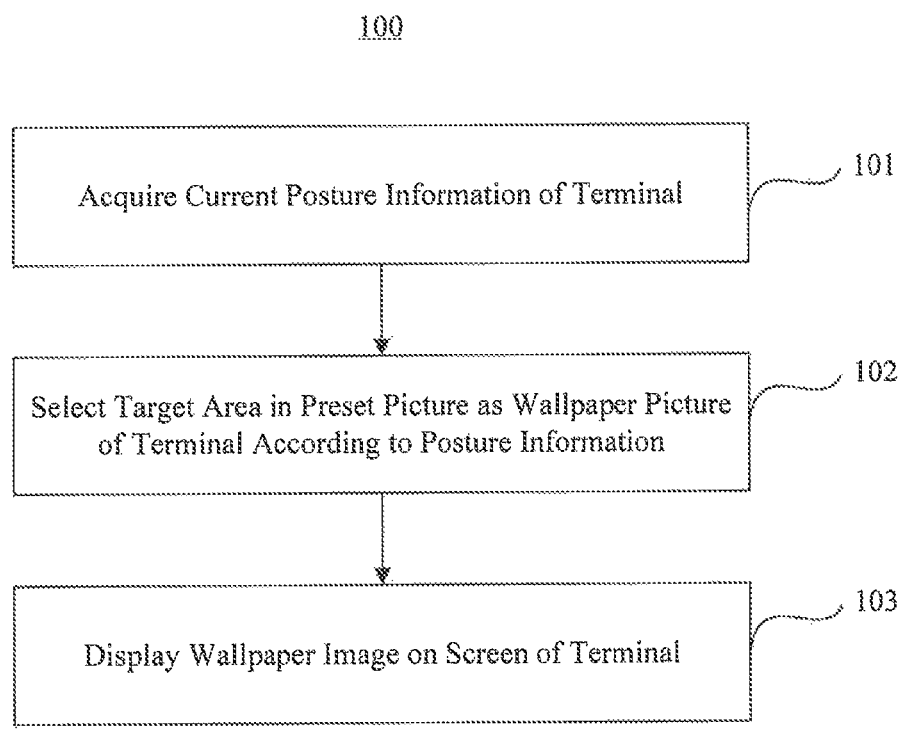
FIG. 1 is a flowchart of a method for displaying an image on a terminal, according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims FIG. 1 is a flowchart of a method 100 for displaying an image on a terminal, according to an exemplary embodiment. Referring to FIG. 1, the method 100 includes the following steps.

In step 101, the terminal acquires current posture information of the terminal.

In step 102, the terminal selects a target area of a preset image as a wallpaper image of the terminal according to the posture information.

In step 103, the terminal displays the wallpaper image on a screen of the terminal In exemplary embodiments, a curl processing is performed on the preset image based on a curl algorithm, such as one known in the art, so as to obtain a processed image.

In exemplary embodiments, a resolution of the preset image is greater than or equal to a preset resolution. The preset image may be a built-in system image of the terminal, a picture taken by a user, or an image obtained by the user from a third party such as a network. The curl processing is performed on the preset image that meets the preset resolution requirement based on the curl algorithm, so as to obtain the processed image, e.g., a spherical image corresponding to the preset image. A target area in the spherical image, selected according to the user's posture information, is consecutive in any direction.

In exemplary embodiments, if the resolution of the preset image does not meet the preset resolution requirement for obtaining the spherical image in the curl algorithm, a complete spherical image may not be obtained after the curl processing. Therefore, before the curl processing, it is determined whether the resolution of the preset image meets the preset resolution requirement for obtaining the spherical image in the curl algorithm. If the preset resolution requirement is met, the curl algorithm is performed, otherwise, parameters in the curl algorithm can be changed, and then the curl algorithm is performed so as to obtain, e.g., a cylindrical image as the processed image. In one exemplary embodiment, a target area in the cylindrical image selected according to the user's posture information can move only in a horizontal direction but not in a vertical direction.

In exemplary embodiments, when the curl processing is performed on the preset image by the curl algorithm, the preset image is curled onto a sphere in accordance with a specific curvature. A center point of the sphere can be denoted by an origin in a three-dimensional coordinate system, denoted by O, a radius of the sphere can be denoted by R, and the sphere can be denoted by $\phi(O)$. In the embodiments, the three-dimensional coordinate system aligns with a coordinate system of a sensor in the terminal.

In exemplary embodiments, a length of a distance between a center point of a virtual screen area of the terminal and the origin of the three-dimensional coordinate system is set according to a value of the radius R, wherein the center point of the virtual screen area of the terminal is denoted by E. The origin O is set as a center point of a sphere where the point E locates, denoted by $\psi(O)$, and a radius of the sphere is denoted by r. In the embodiments, the value of R may be set according to a relationship between the resolution of the preset image and the radius, and the value of r is set manually or by default by the system for meeting an optimal display effect of the wallpaper image. The ratio of R/r may have a proportional relationship, and R>r, which may be understood as that the virtual screen area of the terminal is within the spherical image corresponding to the preset image, i.e., the processed image. In one exemplary embodiment, R/r=1.618, which is the golden ratio.

Because the preset image is a plane image before the curl processing, a coordinate of each pixel in the preset image is a two-dimensional orthogonal coordinate within a two-dimensional coordinate system. The spherical or cylindrical image obtained after the curl processing, i.e., the processed image, is a three-dimensional image. Thus, the coordinate of each pixel in the spherical or cylindrical image is a three-dimensional orthogonal coordinate within a three-dimensional coordinate system. In the curl processing, a corresponding relationship between the two-dimensional orthogonal coordinate of each pixel in the preset image before the curl processing and the three-dimensional orthogonal coordinate of each pixel in the processed image after the curl processing can be recorded.

In exemplary embodiments, the terminal renders the spherical image and presents the rendered image to the user. The terminal can adjust a render effect of the spherical image by, e.g., prettification and blurring, so as to reduce a stiff effect caused by connecting original boundaries of the preset image.

The method 100 increases interactivity between the user and the terminal when the user uses the wallpaper function.

Figure 2:
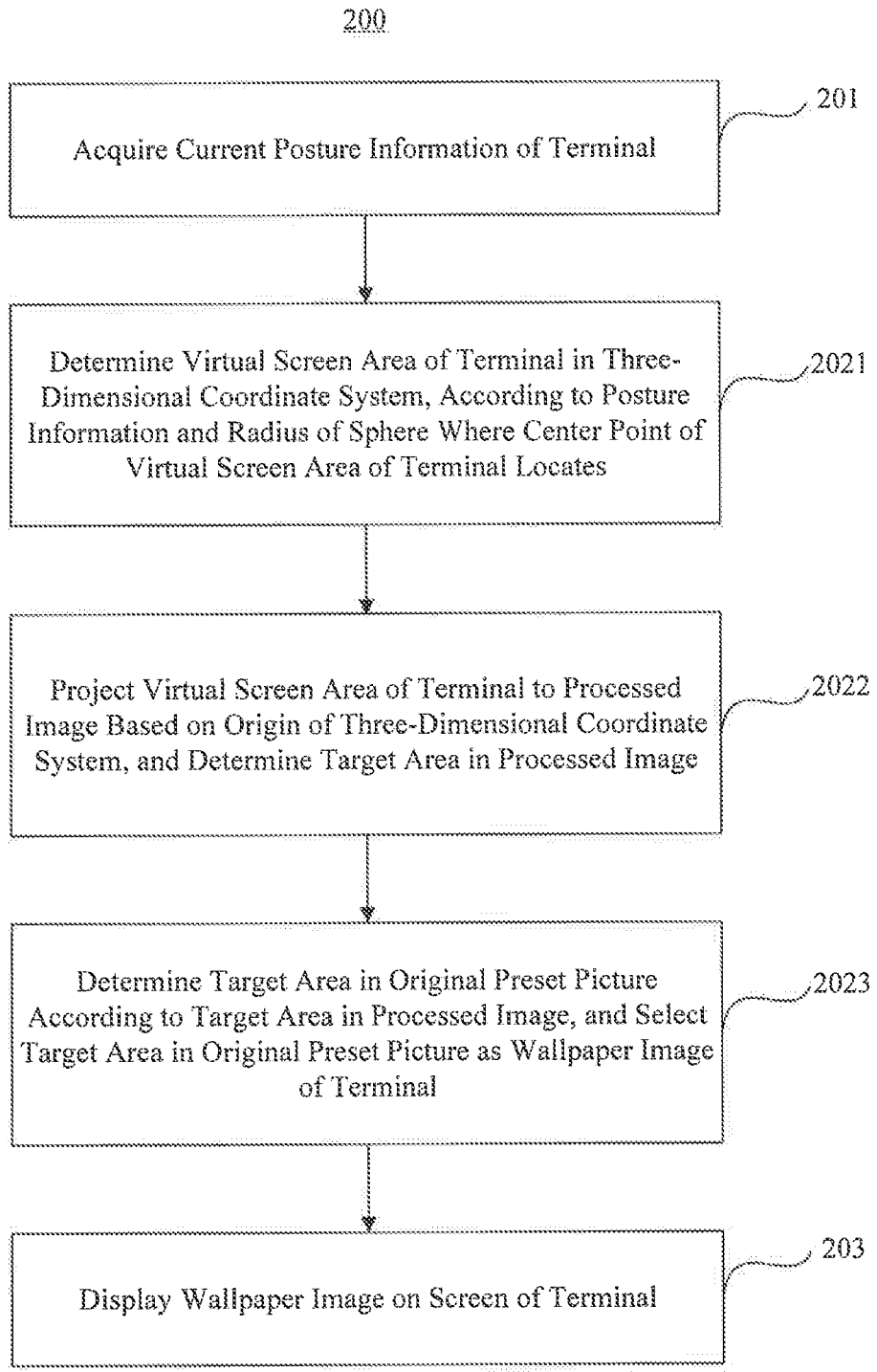
FIG. 2 is a flowchart of a method for displaying an image on a terminal, according to an exemplary embodiment.

FIG. 2 is a flowchart of a method 200 for displaying an image on a terminal, according to an exemplary embodiment. Referring to FIG. 2, the method 200 includes the following steps.

In step 201, the terminal acquires current posture information of the terminal.

In exemplary embodiments, a trigger condition of step 201 may be that, when a screen of the terminal is lighted, step 201 is performed periodically at a preset time interval.

For example, after the screen of the terminal is lighted, e.g., when the terminal enters a normal use state from an unlock state, step 201 is performed periodically. Therefore, the terminal can update the selected target area in the preset image continuously according to the posture information acquired by a sensor in the terminal.

In exemplary embodiments, the current posture information of the terminal is acquired by the sensor built in the terminal, and the sensor may include, but is not limited to, a gravity sensor, a gyroscope sensor, etc.

In exemplary embodiments, the posture information includes Euler angle information of the terminal in the three-dimensional coordinate system corresponding to the terminal. Euler angles are three types of angles of the terminal in the three-dimensional coordinate system, including, e.g., a left and right tilt angle, a back and forth tilt angle, and a left and right swing angle, denoted by ($\alpha$, $\beta$, $\gamma$), respectively.

In exemplary embodiments, the terminal selects a target area in a preset image as a current wallpaper image of the terminal according to the posture information. The selecting of the target area may be implemented by the following steps.

In step 2021, according to the posture information and a radius of a sphere where a center point of a virtual screen area of the terminal locates, the terminal determines the virtual screen area in the three-dimensional coordinate system corresponding to the terminal.

In exemplary embodiments, the terminal first determines a coordinate of the center point of the virtual screen area of the terminal according to the posture information, so as to determine a location of the virtual screen area in the three-dimensional coordinate system according to the coordinate.

For example, according to ($\alpha$, $\beta$, $\gamma$) in the posture information and r, the radius of the sphere where the virtual screen area of the terminal locates, a spherical coordinate of the point E. the center point of the virtual screen area, in the three-dimensional coordinate system may be obtained. Because the point E is located on the sphere $\psi$ (O), and a line between the origin O the sphere $\psi$ (O) and the point E is perpendicular to the virtual screen area of the terminal, and also because in the posture information of the terminal, the point E is not affected by the right and left swing angle $\gamma$, a location coordinate of the point E is denoted by ($\alpha'$, $\beta'$, r), wherein $\alpha'=\alpha+\pi/2$, $\beta'=\beta-\pi/2$. Thus, the location coordinate of the point E is ($\alpha+\pi/2$, $\beta-\pi/2$, r). A posture of the virtual screen area of the terminal can be represented by the location of the point E and the right and left swing angle $\gamma$ of the terminal, that is ($\alpha'$, $\beta'$, r, $\gamma$).

Figure 3:
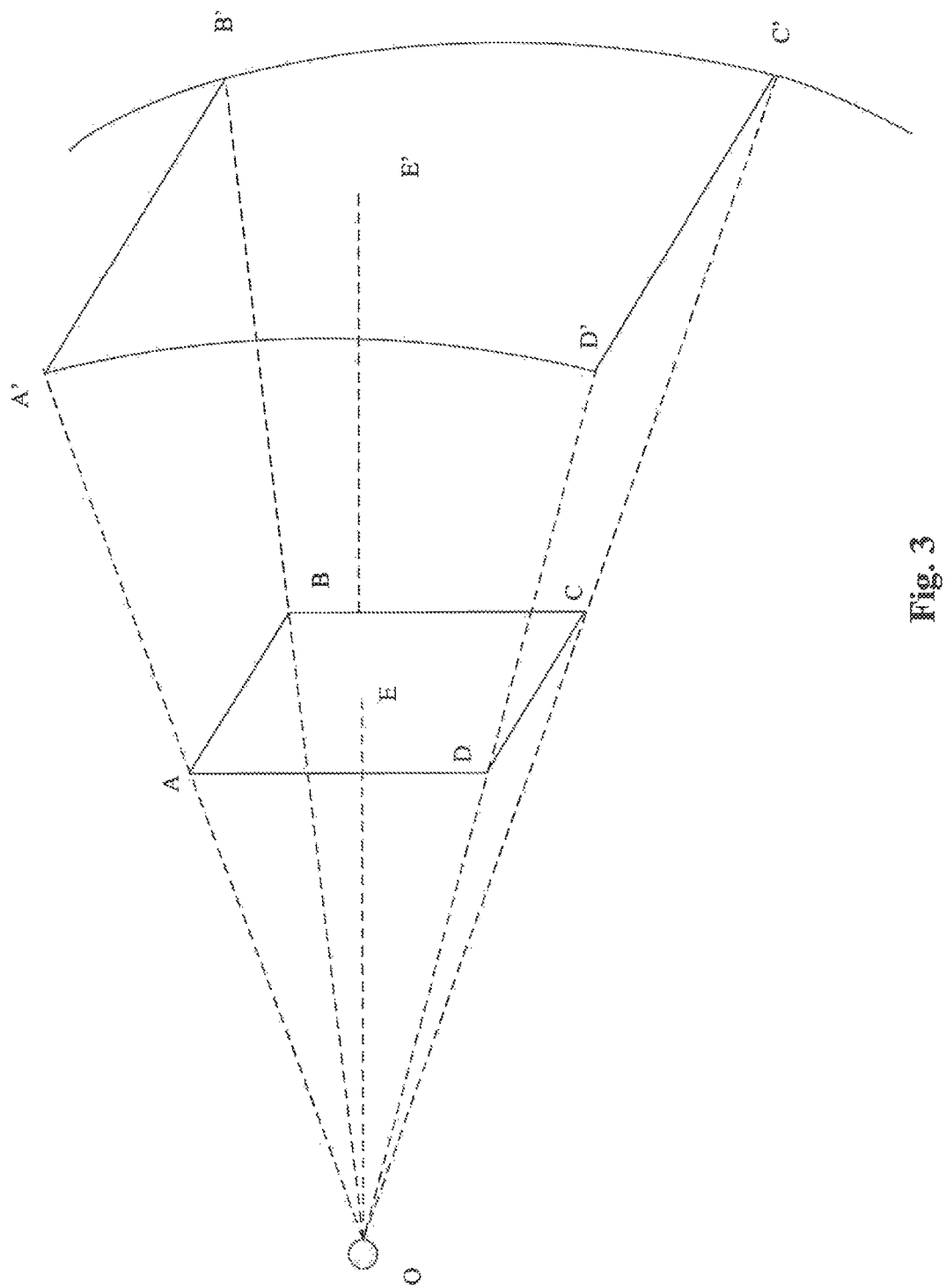
FIG. 3 is a schematic diagram of a method for displaying an image on a terminal, according to an exemplary embodiment.

Assuming that a length and a width of the virtual screen area of the terminal are a and b, respectively, a spherical coordinate of the virtual screen area of the terminal may be determined according to the spherical coordinate of the point E, denoted by ($\alpha'$, $\beta'$, r, $\gamma$, a, b). FIG. 3 is a schematic diagram of selecting a target area in a processed image, i.e., the preset image after the curl processing, in the three-dimensional coordinate system of the terminal, according to an exemplary embodiment. In FIG. 3, a plane area ABCD represents the virtual screen area of the terminal.

Referring to FIGS. 2 and 3, in step 2022, the terminal projects the virtual screen area of the terminal to the processed image, based on the origin of the three-dimensional coordinate system corresponding to the terminal. The target area projected from the virtual screen area of the terminal in the processed image is determined.

In the embodiments, since R>r, the target area projected from the virtual screen area of the terminal has an area larger than that of the virtual screen area of the terminal. As shown in FIG. 3, an area A'B'C'D' represents the projected target area, E' is the center point of the area A'B'C'D', and OE'=R.

In exemplary embodiments, based on the principle of similarity, the spherical coordinate of the target area A'B'C'D' may be obtained by the following equation:

$$(\alpha', \beta', r, \gamma, a, b)*R/r=(\alpha', \beta', R, \gamma, a*R/r, b*R/r) \quad \text{equation (1),}$$

wherein the spherical coordinate of the point E' is denoted by ($\alpha'$, $\beta'$, R).

In other words, in step 2022, the target area in the processed image is determined according to a ratio between the radius of the sphere where the center point of the virtual screen area locates and the radius of the sphere where the processed image locates, and a spherical coordinate of the virtual screen area of the terminal.

In step 2023, according to the target area in the processed image, the terminal determines a target area in the original preset image before the curl processing, and the target area in the original preset image is selected as the wallpaper image of the terminal. In one exemplary embodiment, step 2023 can be implemented by the following steps.

In a first step, according to a spherical coordinate of the target area in the processed image, the terminal calculates a three-dimensional orthogonal coordinate of each vertex of the target area in the processed image.

For example, a transform relationship between the spherical coordinate and the three-dimensional orthogonal coordinate can be expressed as follows:

$$x = r^* \cos \alpha^* \cos \beta \quad \text{equation (2);}$$

$$y = r^* \sin \alpha^* \cos \beta \quad \text{equation (3);}$$

and $$z = r^* \sin \beta. \quad \text{equation (4).}$$

The spherical coordinate of the point E' is transformed into the three-dimensional orthogonal coordinate: $(R^* \cos \alpha'^* \cos \beta', R^* \sin \alpha'^* \cos \beta', R^* \sin \beta')$, which can be denoted by $(x, y, z)$.

Assuming that the three-dimensional orthogonal coordinate of the point A' is $(x', y', z')$, the values of $x'$, $y'$, $z'$ can be determined according to the following equations:

$$(x'-x)^*x + (y'-y)^*y + (z'-z)^*z = 0 \quad \text{equation (5);}$$

and $$y'^2 + z'^2 = x^2 + y^2 + z^2 + (a^2 + b^2) \quad \text{equation (6).}$$

Similarly, three-dimensional orthogonal coordinates of B', C', and D' may be obtained based on equations (5) and (6).

In a second step, according to a corresponding relationship between two-dimensional orthogonal coordinates of pixels in the original preset image amid three-dimensional orthogonal coordinates of pixels in the processed image, the terminal determines the two-dimensional orthogonal coordinate of each vertex of the target area in the original preset image based on the three-dimensional orthogonal coordinate of a corresponding vertex of the target area in the processed image.

In a third step, according to the two-dimensional orthogonal coordinate of each vertex of the target area in the original preset image, the terminal determines the target area in the original preset image, and selects the determined target area as the wallpaper image of the terminal.

In step 203, the terminal displays the wallpaper image on a screen of the terminal. For example, the wallpaper image is displayed on the screen of the terminal by using a wallpaper displaying function.

The method 200 improves interactivity between the user and the terminal when the user uses the wallpaper displaying function.

Figure 4:
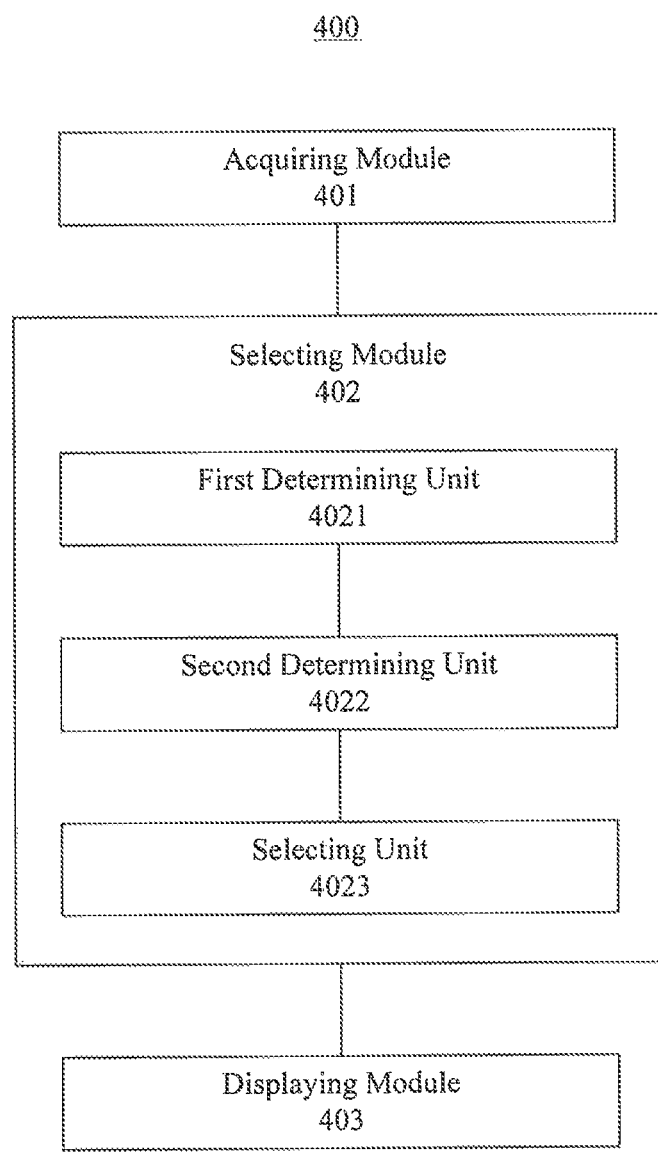
FIG. 4 is a block diagram of a device for displaying an image, according to an exemplary embodiment.

FIG. 4 is a block diagram of a device 400 for displaying an image, according to an exemplary embodiment. Referring to FIG. 4, the device 400 includes an acquiring module 401 configured to acquire current posture information of a terminal; a selecting module 402 configured to select, according to the current posture information, a target area in a preset image as a wallpaper image of the terminal; and a displaying module 403 configured to display the wallpaper image on a screen of the terminal.

In exemplary embodiments, the selecting module 402 includes a first determining unit 4021, a second determining unit 4022, and a selecting unit 4023. The first determining unit 4021 is configured to determine a virtual screen area of the terminal in a three-dimensional coordinate system corresponding to the terminal, according to the posture information and a radius of a sphere where a center point of the virtual screen area of the terminal locates. The second determining unit 4022 is configured to project the virtual screen area of the terminal to a processed image, i.e., the preset image after the curl processing, based on an origin of the three-dimensional coordinate system, and determine a target area in the processed image. The selecting unit 4023 is configured to determine a target area in the original preset image according to the target area in the processed image, and select the target area in the original preset image as the wallpaper image of the terminal.

In exemplary embodiments, the second determining unit 4022 is configured to determine the target area in the processed image, according to a ratio between the radius of the sphere where the center point of the virtual screen area of the terminal locates and a radius of a sphere where the processed image locates, and a spherical coordinate of the virtual screen area of the terminal.

In exemplary embodiments, the selecting unit 4023 includes a calculating sub-unit configured to calculate a three-dimensional orthogonal coordinate of each vertex of the target area in the processed image, according to a spherical coordinate of the target area in the processed image, a determining sub-unit configured to determine a two-dimensional orthogonal coordinate of each vertex of the target area in the original preset image based on the three-dimensional orthogonal coordinate of a corresponding vertex of the target area in the processed image, in accordance with a relationship between two-dimensional orthogonal coordinates in the original preset image and three-dimensional orthogonal coordinates of pixels in the processed image, and a selecting sub-unit configured to determine the target area in the original preset image according to the two-dimensional orthogonal coordinate of each vertex of the target area in the original preset image, and select the target area in the original preset image as the wallpaper image of the terminal.

In exemplary embodiments, the acquiring module 401 is configured to, when the screen of the terminal is lighted, acquire the current posture information of the terminal periodically at a preset time interval.

The device 400 can improve interactivity between the user and the terminal when the user uses a wallpaper displaying function of the terminal.

Figure 5:
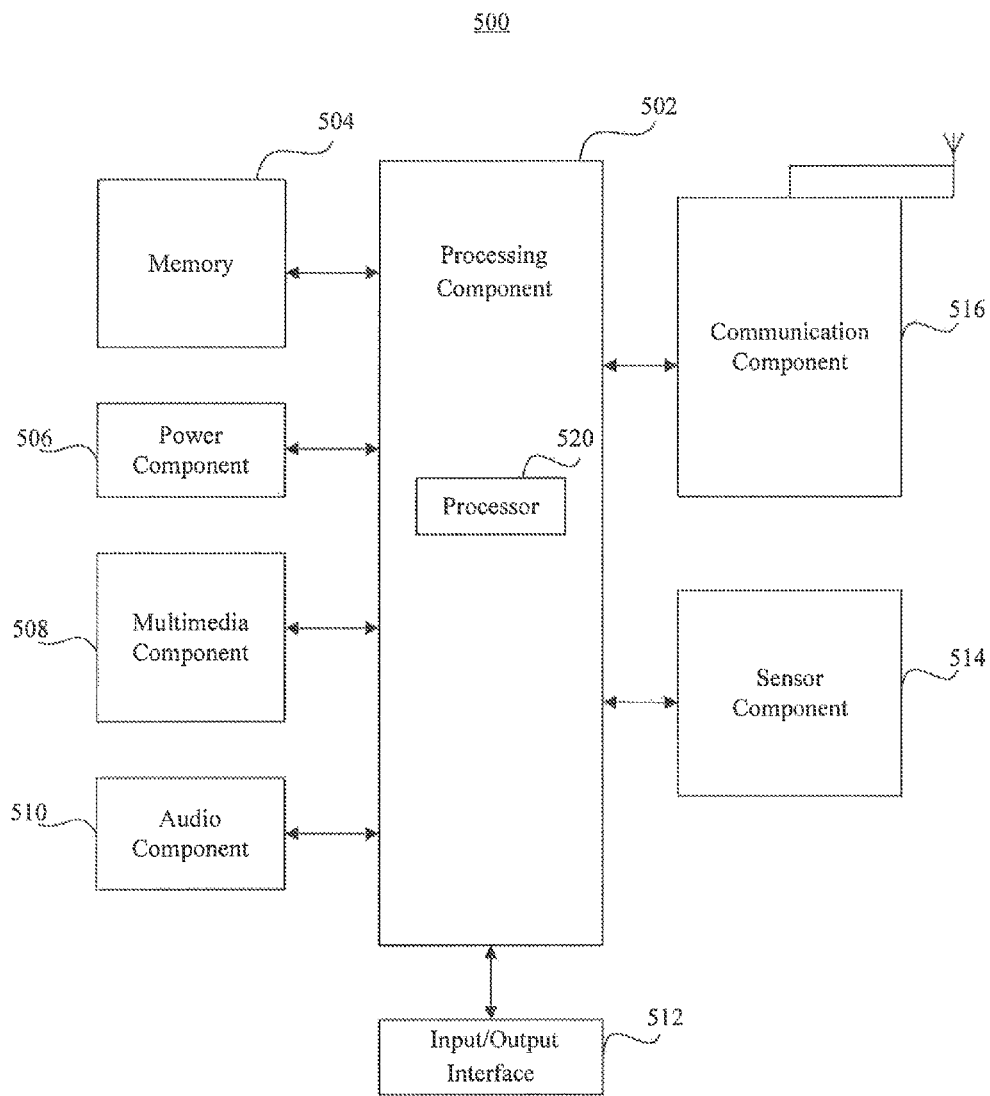
FIG. 5 is a block diagram of a terminal, according to an exemplary embodiment.

FIG. 5 is a block diagram of a terminal 500, according to an exemplary embodiment. For example, the terminal 500 may be a mobile phone, a computer, a digital broadcasting terminal, a messaging device, a game console, a tablet device, medical equipment, fitness equipment, a personal digital assistant, etc.

Referring to FIG. 5, the terminal 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the terminal 500, such as operations associated with display, telephone calls, data communications, camera operations and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the terminal 500. Examples of such data include instructions hr any applications or methods operated on the terminal 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the terminal 500. The power component 506 may include a power management system, one or more power sources, and any other components associated with the generation, management, and distribution of power for the terminal 500.

The multimedia component 508 includes a screen providing an output interface between the terminal 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slides, and gestures on the touch panel. The touch sensors may not only sense a boundary of a touch or slide operation, but also sense a period of time and a pressure associated with the touch or slide operation. In some embodiments, the multimedia component 508 includes a front camera and/or a rear camera. The front camera and the rear camera may receive an external multimedia datum while the terminal 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the terminal 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the terminal 500. For instance, the sensor component 514 may detect an open/closed status of the terminal 500, relative positioning of components (e.g., the display and the keypad of the terminal 500), a change in position of the terminal 500 or a component of the terminal 500, a presence or absence of user contact with the terminal 500, an orientation or an acceleration/deceleration of the terminal 500, and a change in temperature of the terminal 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the terminal 500 and other devices. The terminal 500 can access a wireless network based on a communication standard, such as WiFi, 2G, 3G, etc. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable medium including instructions, such as included in the memory 504 and executable by the processor 520 in the terminal 500, for performing the above-described methods. For example, the non-transitory computer-readable storage medium may be a ROM, a RAM, a CD-ROM, a magnetic tape, a floppy disc, an optical data memory device, and the like.

One of ordinary skill in the art will understand that the above described modules/units can each be implemented by hardware, or software, a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for displaying an image on a terminal, comprising:
   acquiring current posture information of the terminal;
   selecting, according to the current posture information, a target area in a preset image as a wallpaper image of the terminal; and
   displaying the wallpaper image on a screen of the terminal,
   wherein the selecting of the target area in the preset image includes:
   determining a virtual screen area of the terminal in a three-dimensional coordinate system corresponding to the terminal, according to the current posture information and a radius of a sphere where a center point of the virtual screen area of the terminal locates;
   performing a curl processing on the preset image to generate a processed image;
   projecting the virtual screen area of the terminal to the processed image based on an origin of the three-dimensional coordinate system, and determining a target area projected from the virtual screen area of the terminal in the processed image; and
   determining a target area in the original preset image without the curl processing according to the target area in the processed image, and selecting the target area in the original preset image as the wallpaper image of the terminal.

2. The method according to claim 1, wherein the determining of the target area in the processed image comprises:
   determining the target area in the processed image according to a ratio between the radius of the sphere where the center point of the virtual screen area of the terminal locates and a radius of a sphere where the processed image locates, and a spherical coordinate of the virtual screen area of the terminal.

3. The method according to claim 1, wherein the determining of the target area in the original preset image comprises:
   calculating a three-dimensional orthogonal coordinate of each vertex of the target area in the processed image according to a spherical coordinate of the target area in the processed image;
   determining a two-dimensional orthogonal coordinate of each vertex of the target area in the original preset image based on the three-dimensional orthogonal coordinate of a corresponding vertex of the target area in the processed image; and
   determining the target area in the original preset image according to the two-dimensional orthogonal coordinate of each vertex of the target area in the original preset image.

4. The method according to claim 1, wherein the acquiring of the current posture information of the terminal comprises:
   acquiring, after the screen of the terminal is lighted, the current posture information of the terminal periodically at a preset time interval.

5. A terminal, comprising:
   a processor;
   a screen coupled to the processor; and
   a memory configured to provide instructions to the processor;
   wherein the processor executes the instructions to:
   acquire current posture information of the terminal;
   select, according to the current posture information, a target area in a preset image as a wallpaper image of the terminal; and
   display the wallpaper image on the screen of the terminal,
   wherein the select, according to the current posture information, a target area in a preset image as a wallpaper image of the terminal further comprises the processor executes the instructions further to:
   determine a virtual screen area of the terminal in a three-dimensional coordinate system corresponding to the terminal, according to the current posture information and a radius of a sphere where a center point of the virtual screen area of the terminal locates;
   perform a curl processing on the preset image to generate a processed image;
   project the virtual screen area of the terminal to the processed image based on an origin of the three-dimensional coordinate system, and determine a target area projected from the virtual screen area of the terminal in the processed image; and
   determine a target area in the original preset image without the curl processing according to the target area in the processed image, and select the target area in the original preset image as the wallpaper image of the terminal.

6. The terminal according to claim 5, wherein the processor executes the instructions further to:
   determine the target area in the processed image according to a ratio between the radius of the sphere where the center point of the virtual screen area of the terminal locates and a radius of a sphere where the processed image locates, and a spherical coordinate of the virtual screen area of the terminal.

7. The terminal according to claim 5, wherein the processor executes the instructions further to:
   calculate a three-dimensional orthogonal coordinate of each vertex of the target area in the processed image according to a spherical coordinate of the target area in the processed image;
   determine a two-dimensional orthogonal coordinate of each vertex of the target area in the original preset image based on the three-dimensional orthogonal coordinate of a corresponding vertex of the target area in the processed image; and
   determine the target area in the original preset image according to the two-dimensional orthogonal coordinate of each vertex of the target area in the original preset image.

8. The terminal according to claim 5, wherein the processor executes the instructions further to:
   acquire, after the screen of the terminal is lighted, the current posture information of the terminal periodically at a preset time interval.

9. A non-transitory readable storage medium having stored therein instructions that, when executed by a processor of a terminal, cause the terminal to perform a method for displaying an image, the method comprising:

acquiring current posture information of the terminal;
selecting, according to the current posture information, a target area in a preset image as a wallpaper image of the terminal; and
displaying the wallpaper image on a screen of the terminal,
wherein the selecting of the target area in the preset image includes:
determining a virtual screen area of the terminal in a three-dimensional coordinate system corresponding to the terminal, according to the current posture information and a radius of a sphere where a center point of the virtual screen area of the terminal locates;
performing a curl processing on the preset image to generate a processed image;
projecting the virtual screen area of the terminal to the processed image based on an origin of the three-dimensional coordinate system, and determining a target area projected from the virtual screen area of the terminal in the processed image; and
determining a target area in the original preset image without the curl processing according to the target area in the processed image, and selecting the target area in the original preset image as the wallpaper image of the terminal.

* * * * *